United States Patent [19]

Asprey et al.

[11] Patent Number: 4,885,718
[45] Date of Patent: Dec. 5, 1989

[54] EXTENDED COMMUNICATIONS LINK FOR KEYBOARD AND DISPLAY UNITS REMOTELY LOCATED FROM A COMPUTER

[75] Inventors: Robert R. Asprey, Harvest; Remigius G. Shatas, Huntsville, both of Ala.

[73] Assignee: Cybex Corporation, Huntsville, Ala.

[21] Appl. No.: 95,140

[22] Filed: Sep. 11, 1987

[51] Int. Cl.⁴ .......................... G06F 3/00; G06F 3/02; G06F 3/153; H04L 25/00

[52] U.S. Cl. .................................... 364/900; 375/36; 364/927.2; 364/935.5; 364/940; 364/935.2

[58] Field of Search ............................ 375/36, 60, 3, 71; 364/200 MS File, 900 MS File; 330/57; 340/825, 825.29, 825.06

[56] References Cited

U.S. PATENT DOCUMENTS

| | | | |
|---|---|---|---|
| 3,657,478 | 4/1972 | Andrews, Jr. | 178/63 |
| 3,691,295 | 9/1972 | Fisk | 178/58 |
| 3,858,010 | 12/1974 | Higashide | 179/174 |
| 4,303,896 | 12/1981 | Slabinski | 333/28 R |
| 4,476,543 | 10/1984 | Quinones et al. | 364/900 |
| 4,622,551 | 11/1986 | Kupersmith et al. | 340/825.06 |
| 4,630,284 | 12/1986 | Cooperman | 375/36 |
| 4,785,467 | 11/1988 | Yamada | 375/17 |

FOREIGN PATENT DOCUMENTS 2118402A 9/1983 United Kingdom ................ 375/36

Primary Examiner—Archie E. Williams, Jr.
Assistant Examiner—R. Florin Muntheanu
Attorney, Agent, or Firm—C. A. Phillips

[57] ABSTRACT

A communications extension link for use between a computer and a keyboard and display unit has at the computer site a first interface circuit connected to it and adjacent to the keyboard and display unit a second interface circuit connected to it. The two interface circuits may then be spaced serveral hundred feet by an extension cable. The first interface circuit includes capacitors connected between keyboard data and clock lines and a positive supply terminal, and buffer amplifiers are placed in the signal lines relating to the display unit. The second interface circuit employs discrete resistors between clock and data lines and the positive supply terminal, and between the vertical sync line and logic ground. In addition, capacitance is added between the positive supply terminal and logic ground.

2 Claims, 1 Drawing Sheet

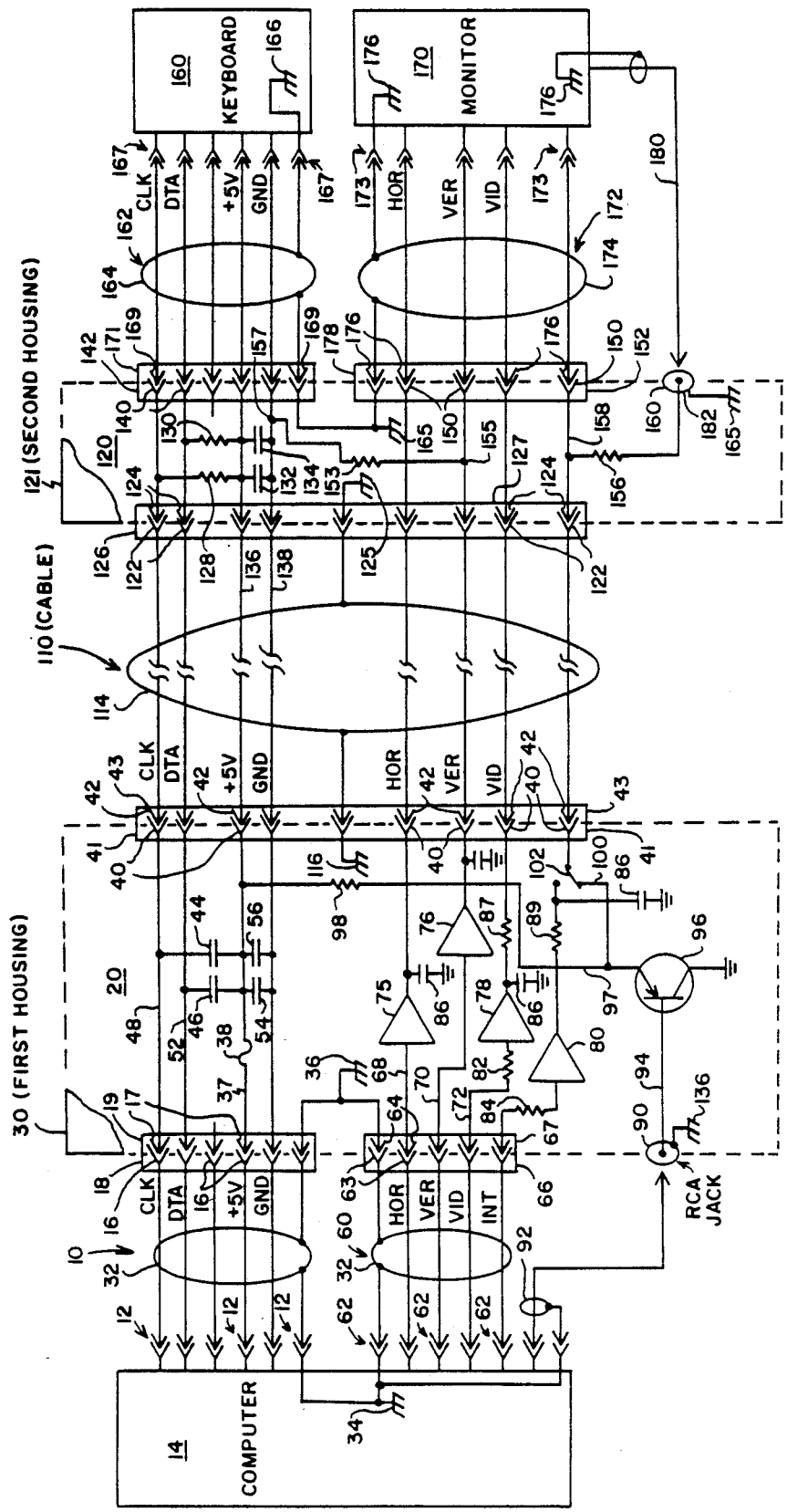

EXTENDED COMMUNICATIONS LINK FOR KEYBOARD AND DISPLAY UNITS REMOTELY LOCATED FROM A COMPUTER

FIELD OF THE INVENTION

This invention relates generally to the coupling of signals between a computer and a keyboard and display unit, or K.D.U., and particularly to a communications link which enables the K.D.U. to be located at extended distances from the computer. In this case, the terminal is a monochrome monitor driven by either TTL or composite monitor video signal levels.

BACKGROUND OF THE INVENTION

It is a convenient practice to physically separate a digital computer from the keyboard and display unit by which the computer is monitored and controlled. Actually the K.D.U. consists of two units, a cathode ray-type display and a keyboard. The cathode ray display or, as it is usually called, a monitor, and keyboard may be in the form of a single housed unit or, as more commonly today with microcomputers, the monitor and keyboard are separate. The most popular microcomputer presently in use is the IBM PC microcomputer, and there are many units made by other manufacturers which generally employ the same or a similar arrangement for interconnection a keyboard and monitor to a computer.

As a matter of convenience, there are separate electrical jacks on these computers for mating plugs, one plug connecting to a monitor cable and the other to a keyboard cable. The opposite ends of these cables have plugs which directly plug into a monitor equipped jack and a keyboard equipped jack. Normally these cables are on the order of four to six feet in length, enabling some, but limited, separation of a monitor-keyboard work station from a computer. This typically requires that the computer and work station be generally located together.

It is to be appreciated, however, that there are situations, in fact, many, where it is desirable to separate the computer and a work station. This may be by virtue of space limitations or because of environmental considerations, the latter sometimes including an inhospitable environment for a computer.

Separation has been attempted by extending the length of the separate connecting cables described above, but it has been found that where the separation is greater than, say, 12-16 feet, reliability is sacrificed. If a single cable housing both monitor and keyboard leads is attempted, as would be the ideal approach for greater distances, signal interaction becomes intolerable. Although it is believed many have attempted to solve the problems involved as they have been present for several years, insofar as applicants are aware, they have not succeeded and that no dual cable linkage system has been successfully employed beyond the 12-16 range, and no successful single cable system has been accomplished other than by the applicants.

The applicants, and, it is believed, others, attempted to employ standard filtering techniques, as by adding capacitance between certain signal lines and ground. This simply does not work, and it appears that others simply gave up.

It is the object of this invention to provide an improved communications link by which a relatively long, single cable connects a computer with a keyboard and display unit and yet provides error-free communications.

SUMMARY OF THE INVENTION

In accordance with this invention, a single, elongated as needed, multi-conductor cable interconnects two discrete circuit assemblies, one being located near a computer and interconnected by separate cables to the keyboard and monitor terminals of the computer and the other circuit assembly, at an opposite end of the cable, being separately interconnected to a keyboard and monitor.

The first circuit assembly employs discrete capacitors connecting between keyboard data and clock lines and a positive supply terminal. In addition, a TTL buffer amplifier is employed in each of the horizontal sync, vertical sync, video, and intensity signal lines. In addition, the signal inputs to the video and intensity buffer amplifiers are fed through small value current limiting resistors.

The second circuit assembly employs discrete resistors from the clock and data lines and positive supply terminal, and a third and lower value resistor is connected between the vertical sync lead and logic ground. Further, capacitance is added between a positive supply terminal and logic ground.

BRIEF DESCRIPTION OF THE DRAWING

The single FIGURE is a schematic diagram of an embodiment of the invention where signal coupling is to a terminal combination employing a monochrome cathode ray display.

DETAILED DESCRIPTION OF THE DRAWING

Referring to the drawing, a shielded cable 10 is connected from keyboard input connector terminals 12 of computer 14 to receptacle terminals 16 housed in receptacle assembly 18. Receptacles 16 connect to plug terminals 17 of plug assembly 19 of signal conditioning circuit 20. Circuit 20 is located in housing 30 and, as labeled, connections to it are clock (CLK), data (DTA), +5 volts (+5 V) and logic ground (GND). Cable shield or sheath 32 of metal is connected to both chassis ground 34 of computer 14 and chassis ground 36 of housing 30. A +5-volt input is coupled from connector terminals 12 from computer 14 via receptacle 16 and plug 17 to lead 37 through fuse 38 to receptacle 40 of receptacle assembly 41. Receptacle 40 is coupled to plug 42 of plug assembly 43, which in turn couples the +5 v. to shielded cable 110. The clock, data, and logic ground leads are similarly connected between like labeled connector terminals 12 to receptacles 16 and plugs 17, which are directly connected to receptacles 40 and plugs 42. Significantly, it has been discovered that interference between the video lines and clock and data lines is substantially reduced by employment of capacitors 44 and 46, capacitor 44 being connected from clock lead 48 to the +5-volt lead 37 and capacitor 46 connected from data lead 52 to +5-volt lead 37. Capacitor 44 has a value of approximately 0.002 mfd, and capacitor 46 has a value of up to approximately 0.006 mfd. In addition, a relatively large capacitor 54, for example, 22 mf, is connected between +5-volt lead 37 and logic ground; and a smaller capacitor 56, for example, 0.1 mf, is also connected between these points. By this means, high frequency noise is shunted to ground via the smaller, faster-acting capacitor. The larger and slower-acting one is used to stablize the +5-v. D.C. supply.

A second shielded cable 60 is connected from monitor output connector terminals 62 of computer 14 to functionally labeled receptacle terminals 63 mounted in receptacle assembly 66 and which connect to plug terminals 64 mounted in plug assembly 67 of signal conditioning circuit 20. As labeled, the monitor terminals are horizontal sync (HOR), vertical sync (VER), video (VID), and intensity (INT). Cable shield 32 is connected to chassis ground 34 of computer 14 and chassis ground 36 of circuit 20. Each of monitor leads 68, 70, 72, and 74 feed the input of a discrete TTL logic buffer amplifier (which switches high and low responsive to discrete high and low signal inputs) of amplifiers 75, 76, 78, and 80. The video input to amplifier 78 and intensity input to amplifier 80 are each fed through small, for example, 20 ohms, current limiting resistors, being resistors 82 and 84. These resistors effect a reduction in switching speed for the amplifiers to reduce output high frequency noise radiation. Each of the monitor signal leads, at the output of the amplifiers, is conventionally connected to ground through 22 pf (approximate) capacitors 86 as a means of reducing stray radiation, and there are small value, e.g., 33 ohms, resistors 87 and 89 in series with the outputs of amplifiers 78 and 80, respectively.

The outputs of amplifiers 75, 76, and 78 are connected to appropriately labeled signal outputs of receptacle terminals 40 of receptacle assembly 41.

A separate RCA-type jack 90 is mounted on housing 30 and is adapted to receive an RCA plug which feeds via a separate shielded cable 92 from a computer, e.g., computer 14, a composite video signal. A lead 94 from jack 90 is connected to the base input of a grounded collector transistor amplifier 96. It is powered through its emitter, being connected by lead 97 through resistor 98 to +5 volt lead 37 and a signal lead 100 connects the emitter to one terminal of selector switch 102. A second input to this switch is connected to the output of intensity amplifier 80. Thus, switch 102 provides on an output terminal of terminals 40, a video intensity signal, or an amplified composite video signal as desired.

A single, shielded, multi-conductor cable 110 has plug terminals 42 plugged into receptacles 40 of circuit 20. Its shield 114 is connected to chassis ground 116, and other leads are connected as labeled. Cable 110 thus includes all leads for both keyboard and monitor, and it may be made for extended range, for example, 50 to 150 feet or greater, terminating at a second signal conditioning circuit 120 where its receptacle terminals 122, mounted in receptacle assembly 126, mate with plug terminals 124, which are mounted in plug assembly 127.

Signal conditioning circuit 120 is mounted within housing 121, and like labeled leads of cable 110 are connected to like functions clock, data, +5-volt logic ground, vertical sync, horizontal sync, video, and intensity plug terminals 124. Shield 114 connects to chassis ground 125. Clock and data leads of the keyboard circuit are connected to +5 volts through resistors 128 and 130, each being closely approximate to 1,000 ohms. This serves to provide additional power to assist the keyboard (160) in raising the clock and/or data line voltage. Capacitor 132, for example, 22 mf, and a smaller capacitor 134, for example, 0.1 mf, are connected between +5 volts lead 136 and logic lead ground 138. The keyboard leads directly interconnect between plug terminals 124 of plug assembly 127 and like function receptable terminals 140 mounted in receptacle assembly 142. The monitor related leads are directly connected between plug terminals 124 of plug assembly 127 and a discrete one of receptacle terminals 150 mounted in receptacle assembly 152, input and output leads functionality being maintained. A resistor 153, for example, 150 ohms, is connected between vertical sync terminal 155 and a logic ground terminal 157.

A small resistor 156, for example, 68 ohms, is connected between lead 158 and an output jack, for example, an RCA ™ jack 160, the outer shield portion of which is connected to ground. This jack provides an output for composite video when switch 102 of circuit 20 is switched to a lower position.

Keyboard 160 is coupled to signal conditioning circuit 120 via a shielded cable 162 having an enclosing shield 164 connected between conditioning circuit ground 165 and keyboard ground 166. The leads of this cable extend from keyboard receptacle terminals 167 and, as functionally labeled, terminate in plug terminals 169 mounted in plug assembly 171. These leads are plugged into receptacles 140 of signal conditioning circuit 120. This thus completes a keyboard circuit between keyboard 160 and computer 14.

Monochrome monitor 170 is similarly connected to signal conditioning circuit 120 via a shielded cable 172 connecting from receptacle terminals 173 of monitor 170 to signal conditioning circuit 120. Shield 174 of cable 172 is connected to chassis ground 176 of monitor 170 and to chassis ground 165 of signal conditioning circuit 120. The function of each of the leads of cable 172 is labeled, and each lead connects to a plug terminal 176 mounted in a plug assembly 178 which plugs into a receptacle assembly 152 having receptacles 150 connected to signal conditioning circuit 120. In addition, single lead shielded cable 180 provides an optional composite of video input to monitor 170, this cable being pluggable into receptacle 182. By the connection of monitor 170 to signal conditioning circuit 120, a circuit is completed between computer 14 and monitor 170.

By virtue of the combination of the two signal conditioning circuits described, shielded cable 110 enables a computer and terminal, or work station, to be widely separated. Tests thus far have shown that this distance can be up to 300 feet and probably may be longer. Interaction between monitor and keyboard circuits have been conditioned by the unique arrangement illustrated in a manner which provides adequate signal levels for communication and at the same time reduces interaction between circuitry elements to a point which enables error-free communications between a keyboard and computer and between a computer and monitor.

What is claimed is:

1. A communications link extending up to 150 feet for coupling the keyboard and monitor connections of a digital computer to a keyboard and monochrome monitor, comprising:
  a first signal conditioning assembly positionable generally proximate to a digital computer, comprising:
  a first housing,
  first cable receptacle terminals supported by said housing and disposed for electrically coupled engagement with a computer-keyboard cable, said first cable receptacle terminals comprising clock, data, positive bias voltage, logic ground, and chassis ground terminals,
  second cable receptacle terminals supported by said first housing and disposed for electrically coupled engagement with a computer-monitor cable, comprising horizontal sync, vertical sync, video, intensity, and chassis ground terminals, third cable receptacle terminals supported by said first housing and comprising clock, data, positive bias voltage, logic ground, horizontal sync, vertical sync, video, video related signal, and chassis ground terminals, and said clock, data, positive bias voltage, logic ground, and chassis ground terminals, and said last-named clock, data, positive bias voltage, logic ground terminals being connected to like designated receptacle terminals of said first and second receptacle terminals, and a first capacitor within said first housing having capacitance of approximately 0.002 mf connected between said clock terminal and positive bias voltage terminal, and a second capacitor within said housing having a capacitance of approximately 0.006 mf connected between said data terminal and a said positive bias voltage terminal;

a relatively large capacitor and a relatively small capacitor within said first housing, both being connected between a said positive bias voltage terminal and logic ground terminal, wherein said relatively large capacitor has capacitance on the order of 22 mf, and said relatively small capacitor has a capacitance on the order of 0.1 mf;

a first logic amplifier being connected in circuit between said horizontal sync terminals and a second logic amplifier being connected in circuit between said vertical sync terminals;

a resistor and third logic amplifier serially in circuit in the named order from said video terminal of said second cable receptacle terminals and said video terminal of said third cable receptacle terminals;

a resistor and fourth logic amplifier serially in circuit in the last-named order between said intensity terminal of said second cable receptacle terminals and said video related terminal of said third cable receptacle terminals;

an elongated cable having a first set of terminals at one end disposed for electrically coupled engagement with said third cable receptacle terminals and having at an opposite end an interconnected set of like identified terminals; and a second signal conditioning assembly comprising:
  a second housing,
  fourth cable receptacle terminals supported by said second housing and having clock, data, positive bias voltage, logic ground, vertical sync, horizontal sync, video, and video related cable receptacle terminals adapted to receive the opposite end terminals of said elongated cable,
  fifth cable receptacle terminals, keyboard terminals, supported by said second housing and having clock, data, positive bias voltage, logic ground, and chassis ground terminals connected to like designated terminals of said fourth cable receptacle terminals,
  sixth cable receptacle terminals, monitor terminals, having vertical sync, horizontal sync, video, video related, and chassis ground terminals connected to like designated terminals of said fourth cable receptacle terminals,
  a first resistor connected between said clock terminal and positive bias voltage terminal, and a second resistor connected between said data terminal and said positive bias voltage terminal, wherein each of said first and second resistors having a value of approximately 1,000 ohms,
  a relatively large capacitor and a relatively small capacitor connected between said positive bias voltage terminal and logic ground terminal of said second signal conditioning assembly, wherein said relatively large capacitor has capacitance on the order of 22 mf, and said relatively small capacitor has a capacitance on the order of 0.1 mf, and
  a third resistor having a resistance value of approximately 150 ohms connected between said vertical sync and logic ground terminals.

2. A communications link as set forth in claim 1 wherein said first signal conditioning assembly further comprises:
  a composite video input terminal;
  a switch having first and second switchable inputs and an output, said output connected to said video related terminal of said third cable receptacle terminals;
  an amplifier having an input connected to said composite video input and an output connected to said first switchable input of said switch and said second switchable input being connected to the output of said fourth logic amplifier, whereby either an amplified version of an intensity signal is supplied to said video related terminal of said third cable receptacle terminals, or an amplified composite video signal is applied to said video related terminal of said third cable receptacle terminals; and
  said second signal conditioning assembly includes a composite video output terminal supported by said second housing and further including an electrical resistor connected between said composite video output terminal and said video related signal terminal of said second signal conditioning assembly.

* * * * *